United States Patent
Delaval et al.

(10) Patent No.: US 8,260,308 B2
(45) Date of Patent: Sep. 4, 2012

(54) METHOD OF OPTIMIZING DATA FORMAT SELECTION PROCEDURE FOR UP LINK COMMUNICATION

(75) Inventors: Guillaume Delaval, Reading (GB); Frank Savaglio, Reading (GB)

(73) Assignee: NEC Corporation, Tokyo (JP)

( * ) Notice: Subject to any disclaimer, the term of this patent is extended or adjusted under 35 U.S.C. 154(b) by 344 days.

(21) Appl. No.: 12/301,570

(22) PCT Filed: May 31, 2007

(86) PCT No.: PCT/JP2007/061087
§ 371 (c)(1),
(2), (4) Date: Nov. 19, 2008

(87) PCT Pub. No.: WO2007/142117
PCT Pub. Date: Dec. 13, 2007

(65) Prior Publication Data
US 2009/0117912 A1    May 7, 2009

(30) Foreign Application Priority Data
May 31, 2006 (FR) ..................... 06 51980

(51) Int. Cl.
*H04W 72/00* (2009.01)
(52) U.S. Cl. ........ 455/450; 455/455; 370/348; 370/329; 370/330
(58) Field of Classification Search ................ 455/13.4, 455/522, 127.1, 69, 436, 437, 438, 442, 63.4, 455/430, 450–453, 455; 370/7.32, 7.37, 370/425.2, 855.8, 318, 395.01, 331, 332, 370/333, 334, 337, 347, 348, 350, 442, 321, 370/459, 335, 336, 342, 345, 346
See application file for complete search history.

(56) References Cited

U.S. PATENT DOCUMENTS

| | | | |
|---|---|---|---|
| 6,240,076 B1 * | 5/2001 | Kanerva et al. | 370/330 |
| 7,801,091 B2 * | 9/2010 | Chillariga et al. | 370/337 |
| 2008/0298387 A1 * | 12/2008 | Lohr et al. | 370/467 |

FOREIGN PATENT DOCUMENTS

| | | |
|---|---|---|
| GB | 2402021 A | 11/2004 |
| WO | 2004/049648 A2 | 6/2004 |
| WO | 2005/125259 A1 | 12/2005 |
| WO | 2006/052932 A1 | 5/2006 |

OTHER PUBLICATIONS

"Universal Mobile Telecommunications System (UMTS)" ETSI Standards, Dec. 2005, pp. 10, 13-14, 19-22, 25-27, 39-46, vol. 3-R1, No. V670, European Telecommunications Standards Institute; FR.
3GPP TS 25.211 V7.0.0, "3rd Generation Partnership Project; Technical Specification Group Radio Access Network; Physical channels and mapping of transport channels onto physical channels (FDD)(Release 7)," Mar. 22, 2006, pp. 1-50.

* cited by examiner

*Primary Examiner* — Rafael Pérez-Gutiérrez
*Assistant Examiner* — Keith Fang
(74) *Attorney, Agent, or Firm* — Sughrue Mion, PLLC

(57) ABSTRACT

The present invention relates to a method of optimizing a data format selection procedure (E-TFC) for up link communication between a terminal and a base station on a cellular communication network in which the base station transmits to the terminal a signal including at least one piece of update information of at least one predetermined parameter intervening the data format selection. The method in accordance with the present invention further includes the step of optimizing a period of time required to detect the signal transmitted from the base station.

9 Claims, 4 Drawing Sheets

METHOD OF OPTIMIZING DATA FORMAT SELECTION PROCEDURE FOR UP LINK COMMUNICATION

TECHNICAL FIELD

The present invention relates to a method of optimizing a data format selection procedure (E-TFC) for up link communication between a terminal and a base station on a cellular communication network; in this method, the base station transmits via a down link path, prior to up link communication, a signal including at least one repetition command to the terminal in a predetermined number of time slots, the command being constructed to update at least one predetermined parameter intervening in the data format selection, and the terminal detects, on receiving the signal via a down link path, information transmitted from the base station and conducts the update according to the detected value during a time window having a predetermined period of time $T_{limit}$.

The present invention relates also to a mobile terminal configured to implement the method.

RELATED ART

Mobile terminals of the third and subsequent generations are increasingly used for high bit rate communication in which data, audio, and video communications are combined with each other in one and the same session. To cope with the expanding bit rate demand, the 3GPP standardization group (Third Generation Partnership Project; third generation mobile communication system standardization project) has proposed the first High Speed Down link Packet Access (HS-DPA) technique enabling data transmission at a bit rate ranging from 8 Mbps to 10 Mbps (20 Mbps in a Multiple-Input Multiple-Output (MIMO) system) in a 5 MHz passing band of down link WCDMA connection.

In most uses on the internet including the browsing, e-mail, and music (audio) or video download, the data bit rate passing the down link from the network to the terminal is remarkably larger than that passing the up link from the terminal to the network. Incidentally, the up link bit rate is desirably improved to secure appropriate bidirectional transmission particularly in real-time uses, for example, in a videoconference.

Hence, to improve the up link bit rate, various jobs are being carried out in the 3GPP group. These jobs are primarily based on the High Speed Uplink Packet Access (HSUPA) technique. This technique resides in update of a WCDMA/UMTS/HSDPA network to conduct various improvements of HSDPA type in the up link flow.

DISCLOSURE OF THE INVENTION

Problem to be Solved by the Invention

However, when an E-DCH channel is set to a mobile terminal, there appear various problems associated with a variety in physical channel configurations. Actually, in transmission via an E-DCH channel, the terminal must beforehand execute tasks in a physical layer L1 and a Medium Access Control (MAC) layer during a predetermined period of time $T_{limit}$ according to a configuration of a physical channel selected by the maker of the mobile terminal.

In one configuration, it is likely that the period of time $T_{limit}$ is insufficient to execute all tasks required to enable the terminal to select a data format suitable for up link transmission.

An object of the present invention is to remove the difficulty.

Another object of the present invention is to optimize an information detection period of time to update a predetermined parameter intervening in the data format selection.

It is therefore an exemplary object of the present invention is to make the terminal adaptable to various configurations of physical layers, particularly, various types of implementation of the value $T_{limit}$, to execute all tasks required to conduct up link transmission through the E-DCH channel.

Means for Solving Problem

To achieve the objects, the present invention recommends a method of optimizing a data format selection procedure (E-TFC) for up link communication between a terminal and a base station on a cellular communication network; in this method, the base station transmits, prior to up link communication, a signal including at least one repetition information item to the terminal in a predetermined number of time slots, the information item being constructed to update at least one predetermined parameter intervening in the data format selection, and the terminal detects, on receiving the signal, a value of a command and conducts the update according to the detected value during a time window having a predetermined period of time $T_{limit}$.

The method in accordance with the present invention further includes the step of optimizing the number of time slots to be used by the terminal to detect the command value transmitted from the base station to use the entire period of time $T_{limit}$, and resultantly, executing the update without deteriorating reliability of the detection of the signal transmitted from the base station.

In a favorable embodiment of the method in accordance with the present invention, transmission of the signal is carried out via an Enhanced Relative Grant Channel (E-RGCH channel)/Enhanced Absolute Grant Channel (E-AGCH channel) and the up link transmission is carried out via an Enhanced Dedicated Physical Data Channel (E-DPDCH).

In the embodiment, the method includes
a step of calculating a period of time $T_{rg}$ between an end of the time slots and a start of the up link transmission,
a step of estimating a period of time $T_{limit}$ available to execute the update,
a step of comparing the period of time $T_{rg}$ with the period of time $T_{limit}$, and
a step of reducing, if the period of time $T_{rg}$ is less than the period of time $T_{limit}$, the number of time slots dedicated to the signal detection.

In a particular embodiment of the present invention, the update parameter during the period of time $T_{limit}$ is associated with at least one of
a Relative/Absolute grant detection procedure,
a procedure to update a "serving grant" procedure,
an E-TFC limitation/selection procedure,
a Data encryption procedure, and
a Turbo encoding procedure.

The present invention also relates to a terminal to transmit/to receive a data packet via a base station on a cellular communication network in which the base station transmits, prior to up link transmission, a signal including at least one repetition command to the terminal in a predetermined number of time slots, the command being constructed to update at least one predetermined parameter intervening in the data format selection, and the terminal detects, on receiving the signal, a value of the command transmitted from the base station and conducts the update according to the detected value during a time window having a predetermined period of time $T_{limit}$.

In accordance with the present invention, the terminal includes means for optimizing the number of time slots to be used to detect the command value transmitted from the base station to use the entire period of time $T_{limit}$, and executing the update without deteriorating reliability of the detection of the signal transmitted from the base station.

Favorably, the terminal in accordance with the present invention includes means for calculating a period of time $T_{rg}$ between an end of the time slots and a start of the up link transmission,
means for estimating a period of time $T_{limit}$ available to execute the update,
means for comparing the period of time $T_{rg}$ with the period of time $T_{limit}$, and
means for reducing, if the period of time $T_{rg}$ is less than the period of time $T_{limit}$, the number of time slots dedicated to the signal detection.

The terminal further includes a software module for optimizing, to enable a mobile terminal to use the entire period of time $T_{limit}$, the number of time slots dedicated to the detection of the command value transmitted from the base station.

BEST MODE FOR CARRYING OUT THE INVENTION

Description will next be given of uses of the above method on the UMTS network to establish a videoconference session by using a High Speed Uplink Packet Access (HSUPA).

To connect to an up link of a high bit rate, the base station on the network sends a signal including a plurality of repetition commands to the terminal in a predetermined number of time slots, the command being constructed so that the terminal updates a predetermined parameter intervening in data format selection. When receiving the signal, the terminal detects the value of the transmitted command to carry out the update according to the detected value. This operation must be executed during a period of time window $T_{limit}$ determined by the maker.

FIG. 1A schematically shows a time series chart presenting a down link channel, i.e., a Downlink Enhanced Relative Grant Channel (DL-E-RGCH) 2 and an up link channel, i.e., an Uplink Enhanced Dedicated Physical Data Channel (UL-E-DPDCH) 4.

On the down link channel DL-E-RGCH, 12 time slots 6 of one down link frame send one UP, DOWN, or HOLD command. By using this command, the terminal can update a parameter intervening in the so-called Relative/Absolute grant detection procedure, for example, a ratio described below which intervenes in the selection of dimensions of the E-DCH block to be sent via the up link.

$$\left(\frac{\beta_d}{\beta_c}\right)^2 \qquad \text{[Expression 1]}$$

wherein $\beta_d$ indicates a gain factor of each DPDCH channel and $\beta_c$ indicates a gain factor of each DPDCH channel.

On the UL-E-DPDCH channel, after one of the commands UP, DOWN, and HOLD is detected, an Enhanced Dedicated Channel-Transmission Time Interval (E-DCH TTI) block 8 including data to be sent from the terminal to the base station is transmitted. According to the command, the terminal can select, for the block E-DCH TTI, dimensions adapted for the data to be sent via the up link.

FIG. 1A shows a case in which the continuous time of the interval TTI is ten milliseconds (ms) and FIGS. 1B and 1C show cases in which the continuous time of the interval TTI is two milliseconds.

The period of time $T_{rg}$ between the 12th time slot 6 and the first TTI indicates a time window available between the end of reception on the DL-E-RGCH channel and the start of up link transmission on the UL-E-DPDCH channel.

$T_{limit}$ indicates a period of time required for the terminal to execute all operations on the L1 layer and the Medium Access Control (MAC) layer to accomplish up link transmission via the UL-E-DPDCH channel.

The period of time $T_{limit}$ depends on the hardware and software configurations selected by the maker of the terminal; in this situation, this restriction must be taken into consideration in the execution of the operations on the L1 and MAC layers.

In the example shown in FIGS. 1A to 1C, the operations on the L1 and MAC layers, particularly include a Relative/Absolute grant detection, update of "serving grant" procedure, an E-TFC limitation/selection procedure, Data encryption, and Turbo encoding.

Referring to FIG. 2, step 10 includes calculating the period of time $T_{rg}$, step 12 includes estimating the available period of time $T_{limit}$, and step 14 includes comparing the time $T_{rg}$ with time $T_{limit}$.

The continuous time of the time window $T_{rg}$ and $T_{limit}$ are expressed by the number of fundamental time units (chips) as prescribed in the technical specification TS25.113 of 3GPP group.

In a situation of the so-called "Relative Grant decoding" procedure, if TTI is 10 ms (i.e., TTI includes ten time slots), $$T_{rg\_10ms} = \tau_{DPCH,n} - \tau_{E\text{-}RGCH,n} + 38400 - 12 \times 2560 + 1024 \quad \text{[Expression 2]}$$

That is, $$T_{rg\_10ms} = \tau_{DPCH,n} - \tau_{E\text{-}RGCH,n} + 8704 \quad \text{[Expression 3]}$$

If TTI is two ms (i.e., TTI includes three time slots), $$T_{rg\_2ms} = \tau_{DPCH,n} - \tau_{E\text{-}RGCH,n} + 38400 - 3 \times 2560 + 1024 \quad \text{[Expression 4]}$$

That is, $$T_{rg\_2ms} = \tau_{DPCH,n} - \tau_{E\text{-}RGCH,n} + 31744 \quad \text{[Expression 5]}$$

wherein:

$\tau_{E\text{-}HICH,n}$ indicates a shift in time (in chip units) of the E-HICH channel associated with the P-CCPCH channel. This value varies between when TTI is 2 ms and when TTI is 10 ms.

$\tau_{E\text{-}RGCH,n}$ indicates a shift in time (in chip units) of the E-HICH channel associated with the P-CCPCH channel. This value varies between when TTI is 2 ms and when TTI is 10 ms.

$\tau_{DPCH,n}$ indicates a shift in time whose starting point is a shift in the P-CCPCH frame. This value is a multiple of 256 chips.

For the predetermined Hybrid Acknowledgement Request (HARQ) procedure, the period of time $T_{limit}$ required for the terminal to execute tasks on the MAC/L1 layers varies between the first transmission of a transmission block and the retransmission thereof. Actually, the E-TFC limitation/selection procedure is not required in the case of retransmission. Hence, in step 12, the terminal confirms the state of the HARQ procedure (whether the first transmission or the retransmission) and selects an appropriate $T_{limit}$ value.

If $T_{rg}$ is less than $T_{limit}$ (arrow 16), the subsequent step 18 includes reducing the number of time slots 2 transmitting signals and step 20 includes detecting signals using the number of remaining time slots.

If $T_{rg}$ is less than $T_{limit}$, there appears a serious situation in which the terminal cannot execute all steps of the MAC/L1 layers. In this situation, the number of time slots employed to execute the detection of the command value transmitted via a down link path is reduced according to a procedure to assign an intermediate value $V_{rg}$ to $T_{rg}$,
a procedure to initialize the number of time slots to 12 if TTI is 10 ms (3 if TTI is 2 ms),
a procedure to reduce the value by 2560 chips if $T_{rg}$ is less than $T_{limit}$, and
a procedure to decrement the number of time slots.

As shown in FIG. 1A, $T_{rg}$ is less than $T_{limit}$ and the terminal does not have a period of time enough to execute processings on the physical layer L1 and the MAC layer. In this case, the terminal employs a time slot group 30 which does not include 12 time slots, but includes only five time slots 6 to detect the command value transmitted from the base station.

Similarly, in the example shown in FIG. 1B, $T_{rg}$ is less than $T_{limit}$ and the terminal does not have a period of time enough to execute processings on the physical layer L1 and the MAC layer. In this case, the terminal employs a time slot group 32 which does not include three time slots, but includes only two time slots, to detect the command value transmitted from the base station. The example shown in FIG. 1C corresponds to the retransmission on the UL-E-DPDCH channel after the first failure.

In this situation, the procedure to select the E-TFC format is not again executed. In this case, a period of time to be allocated to this procedure is derived from $T_{limit}$. As a result, $T_{limit}$ is less than $T_{rg}$; and the terminal has a period of time enough to execute processings on the physical layer L1 and the MAC layer in this case. Hence, the terminal uses all of three time slots composing TTI to transmit signals.

Referring to FIG. 3 showing execution of the "Relative Grant detection" procedure, the contents of the respective time slots Ci on the DL-E-RGCH channel are multiplied by a signature Si, and the results of the multiplication are added to each other. Thereafter, a mean value of the sum thus obtained is calculated to detect the UP, DOWN, or HOLD value of the signals transmitted from the base station.

As can be seen from FIG. 3A, 12 time slots are used for the detection; on the other hand, only six time slots are employed in the example shown in FIG. 3B.

In a particular embodiment of the present invention, two threshold values are defined to detect the command value transmitted via a down link path in which a first threshold value RG_UP_TH corresponds to the value of UP and a second threshold value RG_DOWN_TH corresponds to the value of DOWN.

In accordance with a feature of this embodiment, the defined threshold values RG_UP_TH and RG_DOWN_TH can be adapted to improve reliability of the detection.

FIG. 4 is a graph showing an influence of correction of the defined threshold values upon the reliability of the detection of the command value sent via a down link path to the terminal.

A section "G" on the left side of FIG. 4 shows an example in which 12 time slots of the DL-E-RGCG channel are employed for the detection.

A section "D" on the right side of FIG. 4 shows an example in which only (12-X) time slots selected from the 12 time slots of the DL-E-RGCG channel are employed for the detection. X is an integer equal to or less than 12.

In the latter case, the threshold value RG_UP_TH is increased by the value of Δup and the threshold value RG_DOWN_TH is decreased by the value of Δdown. In this situation, the new threshold values to be detected are respectively RG_UP_TH+X. Δup and RG_DOWN_TH−X. Δdown.

Probability of detection of the value UP indicated by segments before adaptation of the threshold values is higher than that of the value UP after the adaptation of the threshold values. As a result, the higher the threshold values are, the lower the probability of detection of a wrong UP or Down command value is.

The Δup and Δdown values are selected to lower the detection probability of the UP or DOWN value while keeping an appropriate probability when the detection is not carried out. In other words, for the adaptation of the threshold values, the wrong detection of the HOLD value takes precedence over the wrong detection of the UP or DOWN value. Resultantly, if the signal value is dubious, the terminal does not update the parameter required for the up link transmission on the UL-E-DPDCH channel.

Description has been given of the invention of the present application by referring to an exemplary embodiment, but the present invention is not restricted by the embodiment. The configurations and details of the present invention may be changed in various ways by those skilled in the art within the scope of the present invention.

This application claims priority from French Patent Application Reference No. 0651980 filed on May 31, 2006, the entire disclosure of which is incorporated herein by reference.

Figure 1A:
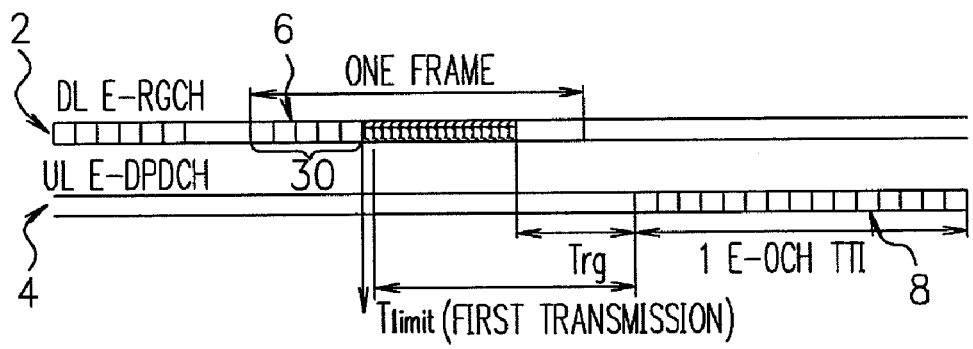
FIGS. 1A to 1C include a time series chart of time slots adopted respectively in up link transmission and down link transmission and charts schematically showing time windows available between the two types of transmission.
Figure 1B:
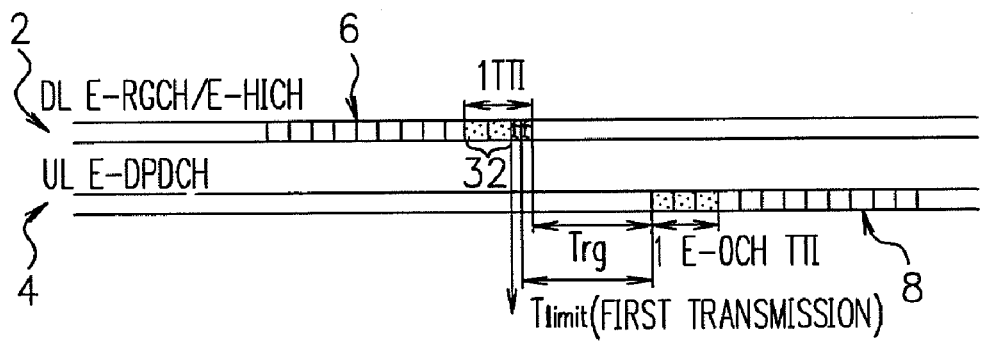
Figure 1C:
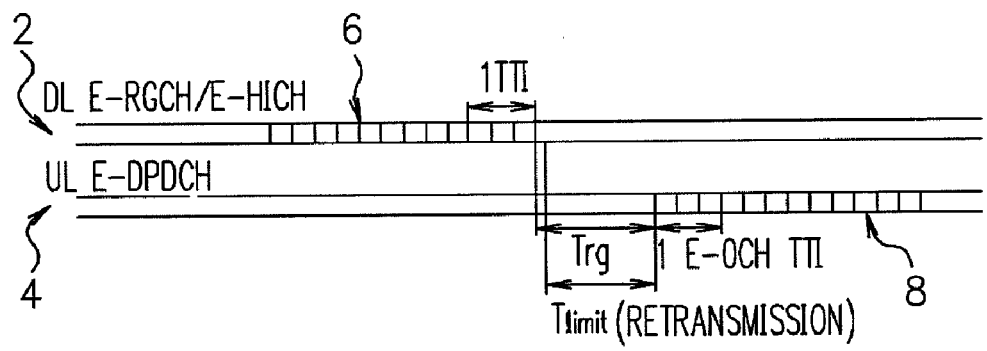
Figure 2:
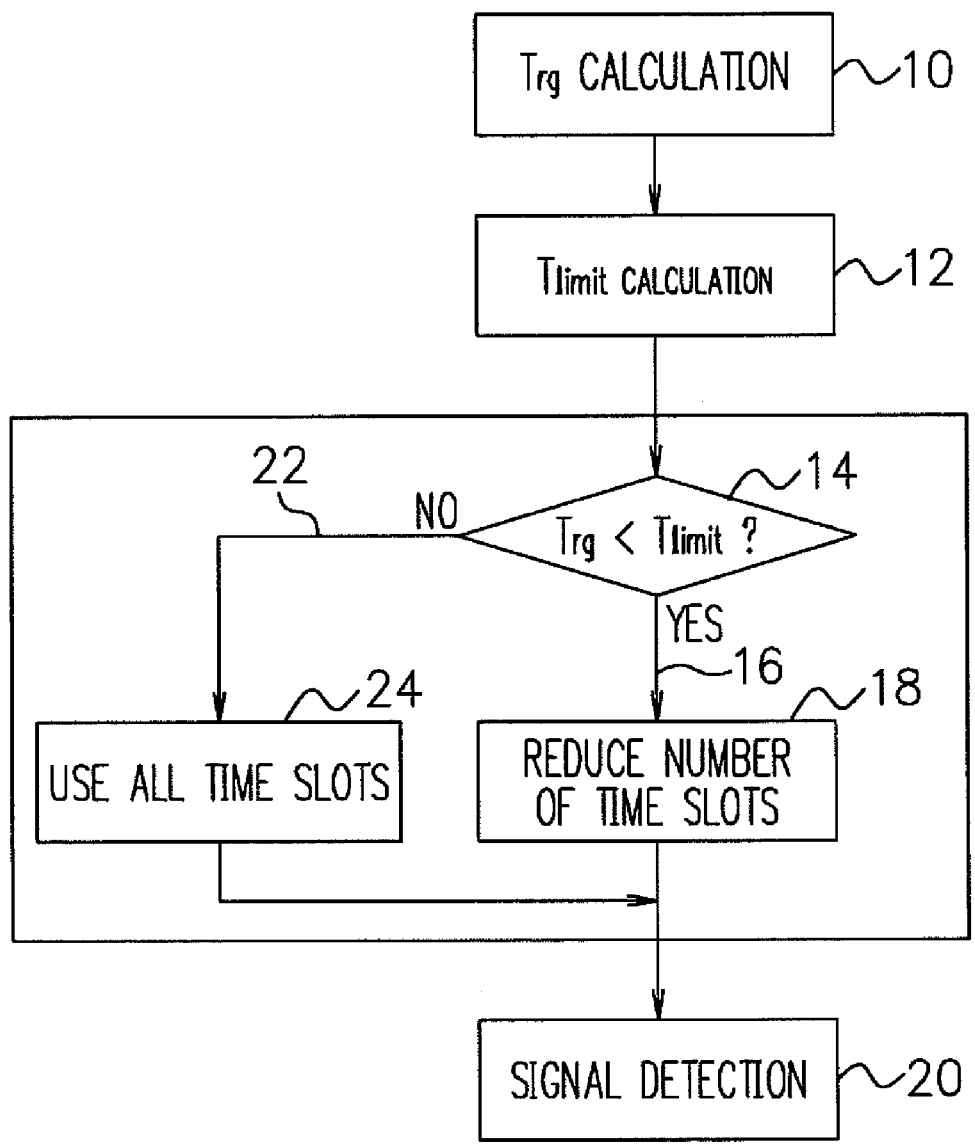
FIG. 2 is a flowchart showing main steps of the method in accordance with the present invention.
Figure 3:
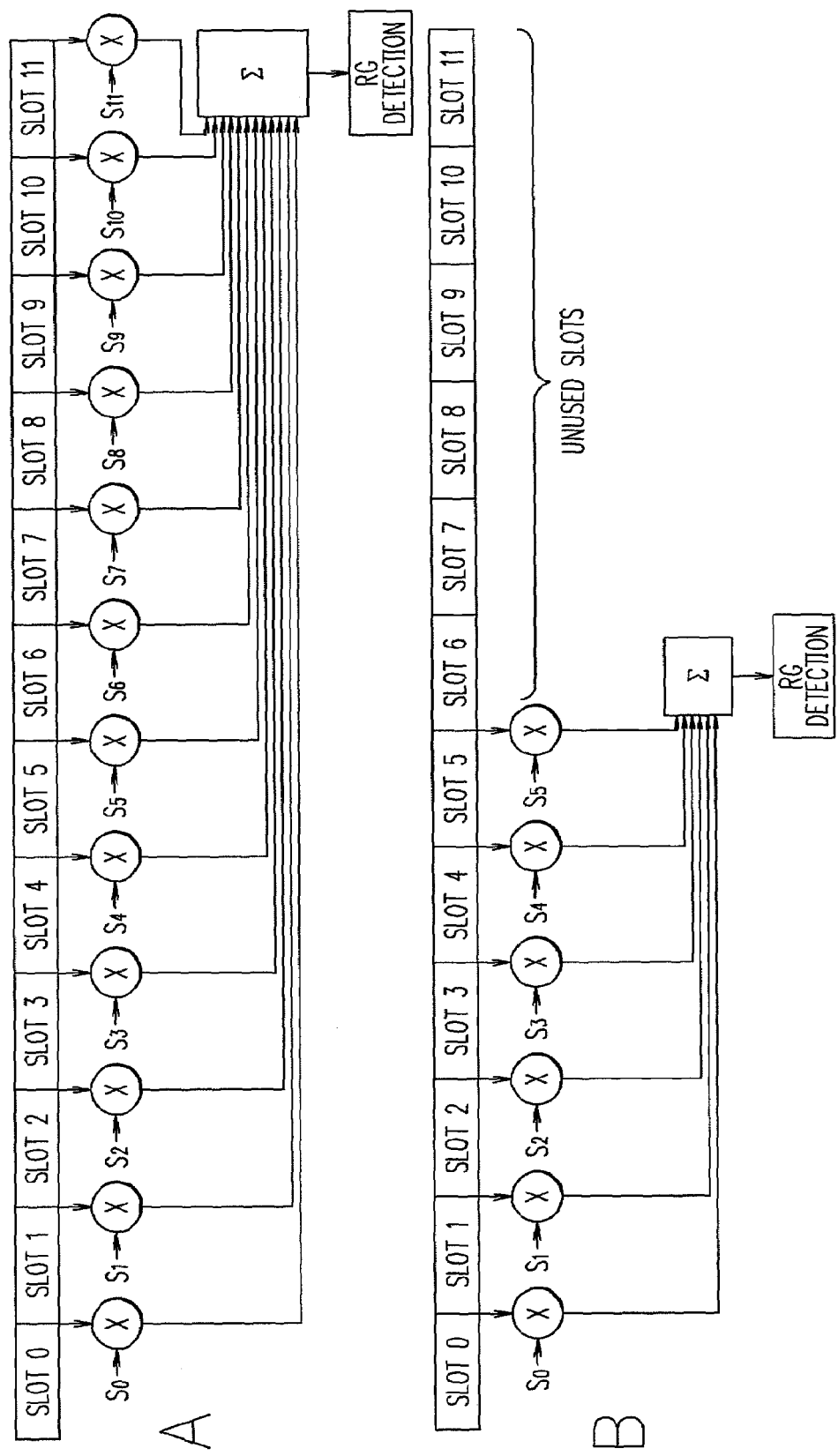
FIGS. 3A and 3B are diagrams showing processings of time slots on a down link path respectively when the method of the present invention is employed and when the method is not employed.
Figure 4:
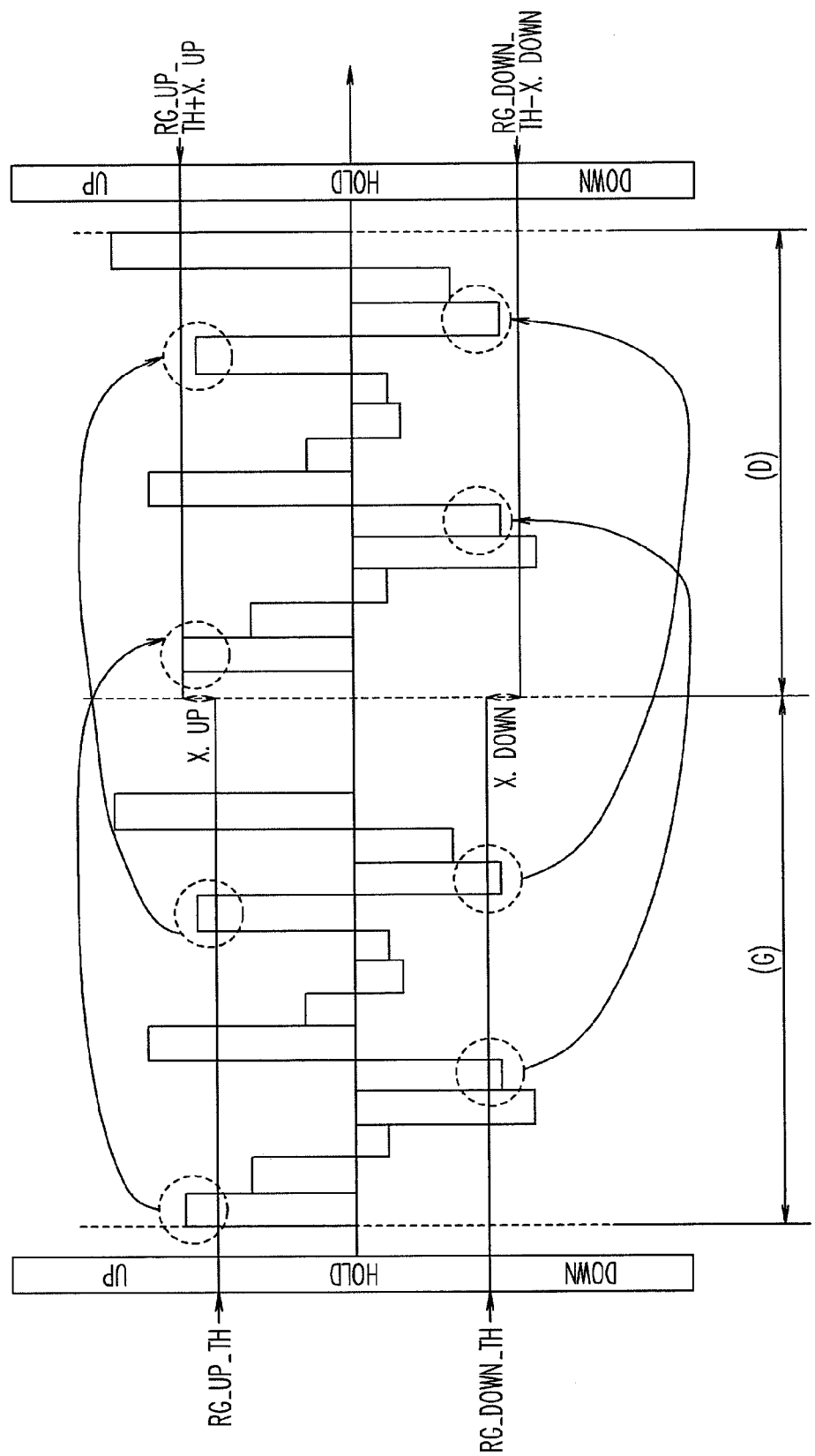
FIG. 4 is a graph showing influence of adaptation of detected threshold values upon the information transmitted from the network via a down link path to the terminal.

The invention claimed is:

1. A method of optimizing a data format selection procedure (E-TFC) for up link transmission between a terminal and a base station, comprising:
optimizing the number of time slots to be used by the terminal to detect a command value transmitted from the base station to use the entire period of time $T_{limit}$, and executing an update, wherein the base station transmits a signal including at least one repetition command to the terminal in a predetermined number of time slots, the command constructed to update at least one predetermined parameter intervening in the data format selection, and the terminal detects, on receiving the signal, the command value and conducts the update according to the detected value during a time window having a predetermined period of time $T_{limit}$;
calculating a period of time $T_{rg}$ between an end of the time slots and a start of the up link transmission;
estimating a period of time $T_{limit}$ available to execute the update;
comparing the period of time $T_{rg}$ with the period of time $T_{limit}$; and
reducing, if the period of time $T_{rg}$ is less than the period of time $T_{limit}$, the number of time slots dedicated to the signal detection.

2. The method in accordance with claim 1, wherein the transmission of the signal including the repetition command is carried out via an Enhanced Relative Grant Channel (E-RGCH channel) and the up link transmission is carried out via an Enhanced Dedicated Physical Data Channel (E-DP-DCH).

3. The method in accordance with claim 1, wherein the update parameter during the period of time $T_{limit}$ is associated with at least one of:
   a relative/absolute grant detection procedure;
   a procedure to update a serving grant procedure;
   an E-TFC limitation/selection procedure;
   a data encryption procedure; and
   a data turbo encoding procedure.

4. The method in accordance with claim 1, wherein the communication network between the terminal and the base station is a UMTS network.

5. A terminal comprising:
   a unit that detects, on receiving a signal including a repetition command constructed to update at least one predetermined parameter intervening in a data format selection, a command value and conducting the update according to the detected value during a time window having a predetermined period of time $T_{limit}$;
   a unit that optimizes the number of time slots to be used to detect the command value and conducting the update by using the entire period of time $T_{limit}$;
   a unit that calculates a period of time $T_{rg}$ between an end of the time slots and a start of the up link transmission;
   a unit that estimates a period of time $T_{limit}$ available to execute the update;
   a unit that compares the period of time $T_{rg}$ with the period of time $T_{limit}$; and
   a unit that reduces, if the period of time $T_{rg}$ is less than the period of time $T_{limit}$, the number of time slots dedicated to the signal detection.

6. The terminal in accordance with claim 5, wherein the number of time slots dedicated to the detection of the command value is optimized.

7. A method comprising:
   detecting, on receiving a signal including a repetition command constructed to update at least one predetermined parameter intervening in a data format selection, a command value and conducting the update according to the detected value during a time window having a predetermined period of time $T_{limit}$;
   optimizing the number of time slots to be used to detect the command value and conducting the update by using the entire period of time $T_{limit}$;
   wherein the optimizing comprises:
   calculating a period of time $T_{rg}$ between an end of the time slots and a start of the up link transmission;
   estimating a period of time $T_{limit}$ available to execute the update;
   comparing the period of time $T_{rg}$ with the period of time $T_{limit}$; and
   reducing, if the period of time $T_{rg}$ is less than the period of time $T_{limit}$, the number of time slots dedicated to the signal detection.

8. A non-transitory computer-readable medium storing a program making a computer to execute:
   processing which detects, on receiving a signal including a repetition command constructed to update at least one predetermined parameter intervening in a data format selection, a command value and which conducts the update according to the detected value during a time window having a predetermined period of time $T_{limit}$;
   processing which optimizes the number of time slots to be used to detect the command value and which conducts the update by using the entire period of time $T_{limit}$,
   wherein the processing which optimizes the number of time slots comprises:
   processing which calculates a period of time $T_{rg}$ between an end of the time slots and a start of the up link transmission;
   processing which estimates a period of time $T_{limit}$ available to execute the update;
   processing which compares the period of time $T_{rg}$ with the period of time $T_{limit}$; and
   processing which reduces, if the period of time $T_{rg}$ is less than the period of time $T_{limit}$, the number of time slots dedicated to the signal detection.

9. A terminal comprising:
   means for detecting, on receiving a signal including a repetition command constructed to update at least one predetermined parameter intervening in a data format selection, a command value and conducting the update according to the detected value during a time window having a predetermined period of time $T_{limit}$;
   means for optimizing the number of time slots to be used to detect the command value and conducting the update by using the entire period of time $T_{limit}$;
   means for calculating a period of time $T_{rg}$ between an end of the time slots and a start of the up link transmission;
   means for estimating a period of time $T_{limit}$ available to execute the update;
   means for comparing the period of time $T_{rg}$ with the period of time $T_{limit}$; and
   means for reducing, if the period of time $T_{rg}$ is less than the period of time $T_{limit}$, the number of time slots dedicated to the signal detection.

* * * * *